United States Patent [19]

Solanki et al.

[11] Patent Number: 5,236,116
[45] Date of Patent: Aug. 17, 1993

[54] HARDFACED ARTICLE AND PROCESS TO PROVIDE POROSITY FREE HARDFACED COATING

[75] Inventors: Mukesh Solanki, New Albany, Ind.; John Handzel, Salem, both of Ind.; Carl Coslow, Louisville, Ky.

[73] Assignee: The Pullman Company, Livingston, N.J.

[21] Appl. No.: 749,975

[22] Filed: Aug. 26, 1991

[51] Int. Cl.$^5$ .......................... B23K 31/02; B22F 7/04
[52] U.S. Cl. .................................. 228/178; 228/228; 228/231; 228/235.1; 419/8
[58] Field of Search ............... 228/178, 228, 231, 234; 419/9, 8

[56] References Cited

U.S. PATENT DOCUMENTS

| | | | |
|---|---|---|---|
| 3,743,556 | 7/1973 | Breton et al. | 228/121 |
| 3,916,506 | 11/1975 | Wolf | 228/122 |
| 4,194,040 | 3/1980 | Breton et al. | 419/32 |
| 4,939,101 | 7/1990 | Black et al. | 228/231 |
| 4,966,748 | 10/1990 | Miyasaka et al. | 419/8 |

OTHER PUBLICATIONS

"Hot Isostatic Pressing of Metal Powders," *Metals Handbook*, 9th Ed., vol. 7, ASM, Metals Park, Ohio, 1984, pp. 419, 436.

*Primary Examiner*—Kurt C. Rowan
*Assistant Examiner*—Jeffrey T. Knapp
*Attorney, Agent, or Firm*—John G. Gilfillan, III

[57] ABSTRACT

There is provided an improved coated composite article and an improved process for making the article. A cloth-like flexible preform is brazed to a metallic substrate to make the article. The article is then subjected to a uniform high pressure and temperature for sufficient time to remove porosity in the coating. The result is a fully dense coating, which is metallurgically bonded to the substrate without any porosity, which has improved physical properties, and which is capable of being polished to a surface finish of at least 4 RMS.

8 Claims, 2 Drawing Sheets

HARDFACED ARTICLE AND PROCESS TO PROVIDE POROSITY FREE HARDFACED COATING

The present invention relates to the modification of selected physical properties of hardfaced metal articles, and, more particularly, to improved wear-resistance and surface finish conditions in hardfaced metal substrates.

BACKGROUND OF THE INVENTION

It is sometimes advantageous to coat a substrate, especially a metal substrate, with a coating having special properties, for example wear-resistance or corrosion-resistance. Wear-resistance can be imparted to a substrate by coating it with a mixture of a hard abrasive material, such as powdered tungsten carbide or the like, and a hard filler metal in which the abrasive material is dispersed. Corrosion resistance can be imparted to a substrate with a similar coating composed of a corrosion-resistant metal or alloy. Other special or improved physical properties can be obtained in a similar manner substituting other matrix materials.

Prior to the work of Breton et al. (U.S. Pat. Nos. 3,743,556, 3,916,506, and 4,194,040 the specifications and claims of which are incorporated herein by reference), it was often difficult to produce the above type of coating, especially on substrates having an intricate or complicated shape, substrates needing a reliable metallurgical bond between substrate and coating, substrates requiring nearly void-free coatings or substrates requiring a coating of greater than 0.020 of an inch. In prior art methods, which used techniques such as plasma and flame spraying and dusting, it was difficult to provide uniform coatings on substrates, and such coatings as were produced were not void-free, nor were the coatings metallurgically bonded to the substrate to prevent spalling in use.

Breton et al. eliminated many of the difficulties that existed in the prior art methods by providing a unique coated article and method of manufacturing it. The method uses a first layer of a desired thickness of a high-melting-point powdered matrix material in an organic binder material and a second layer of a lower-melting-temperature powdered brazing filler material also in an organic binder. The first layer is placed on the substrate with the second layer in turn placed on the first layer. The matrix is characterized as being wettable by the braze filler metal or alloy in the molten state. The layered assembly is then heated to decompose the binder and melt the filler metal or alloy which is infused by capillary action into the matrix layer. Cooling then yields a substantially, but not completely, void-free (porosity less than about 5%) coating metallurgically bonded on the substrate. The method for preparing both the hard particle matrix material as well as the braze filler alloy layers or preforms using fibrillated polytetrafluoroethylene (PTFE), is disclosed in U.S. Pat. Nos. 3,916,506 and 4,194,040.

In certain applications, it has been found that even the minimal porosity generated using the foregoing process can be detrimental. Examples of such applications are high pressure seals, articles mandating highly polished surface requirements and/or articles requiring exceptional mechanical properties. One further method of attempting to solve the problem and to increase the desired properties of the coating is to increase the solid density of the matrix layer by using multiple layers of hard particle sheets as disclosed in copending application Ser. No. 475,745, filed Feb. 6, 1990 and assigned to The Pullman Company, assignee of this present application. This method does improve mechanical properties of the coating but does not provide the desired coating in all respects as needed for all types of applications as set forth above.

SUMMARY OF INVENTION

The present invention provides a coated article and process for producing such articles which is fully dense, that is, with the porosity of the surface coating being essentially zero.

Such a coated article is capable of having its surface polished to an extremely high surface finish or root means square roughness or value (RMS). Additionally, the absence of porosity increases the mechanical properties (wear resistance, etc.) of the coating. To eliminate the small amount of porosity in the coating according to the present invention, the hardfaced coating applied on the article using hard particle matrix and filler metal flexible sheets is subjected to high uniform pressure and temperature to provide for the removal of porosity in the coating and result in densification of the coating.

In accordance with one aspect of the present invention, there is provided a coated composite article capable of having a surface finish of 4 RMS or better produced by brazing a cloth-like flexible metallic preform layer containing matrix particles in PTFE carrier material to a surface of a metal substrate to create a coating on the substrate and then subjecting said coated composite article to high uniform pressure and temperature for sufficient time to remove porosity in the coating thereby providing a fully dense coating metallurgically bonded to the substrate.

In accordance with a more particular aspect of the present invention, the coated article is subjected to a uniform pressure of at least 10,000 psi and a temperature less than the solidus temperature of the braze filler material in the coated article.

In accordance with another more particular aspect of the present invention, the matrix particles are selected from the group consisting of tungsten carbide, titanium carbide, nickel boride and chromium carbide.

In accordance with yet another particular aspect of the present invention, the metallic coating comprises the residue of a plurality of thin cloth-like flexible metallic layers.

In accordance with yet another aspect of the present invention, there is provided a method of producing a fully dense coated article in which the article has a hard metallic surface layer on a substrate. The surface layer is formed by the residue of a flexible cloth-like preform made by first mixing a powdered metal of the surface layer with PTFE and then mechanically fibrillating and rolling the mixture to form said preform of desired configuration. The preform is placed on the substrate, and the surface layer preform is heat-brazed to the substrate yielding a metallurgically bonded coated article. The method is improved by subjecting the coated article to a high uniform pressure and temperature for sufficient time to remove porosity in the coating.

One benefit obtained by the present invention is to provide a composite coated article with improved physical properties in its coating layer in which the coating layer can be polished to a very smooth surface finish.

Another benefit obtained by the present invention is to provide a fully dense coating on a substrate in which the coating is metallurgically bonded to the substrate.

It is an object of this invention to provide an improved coating.

It is another object of the present invention to provide a hardfaced coating capable of being polished to a very smooth surface finish without porosity.

It is yet another object of the present invention to provide a method for producing a fully dense coating metallurgically bonded to a substrate.

Further features and advantages of the invention will readily be apparent from the specification and from the drawings.

DETAILED DESCRIPTION OF THE INVENTION

Figure 1:
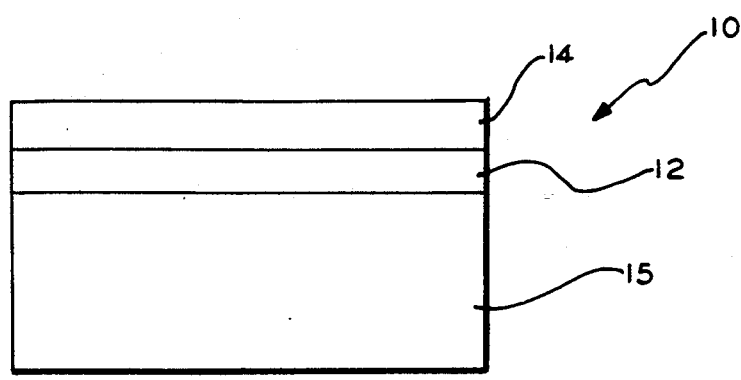
FIG. 1 illustrates a composite coated article made according to the prior art.

Referring now to the drawings wherein the showings are for the purposes of illustrating the prior art and preferred embodiments of the invention only and not for the purpose of limiting same. FIG. 1 shows a composite coated article 10 of the prior art in which a hard matrix surface layer or preform 12 and a braze metal layer preform 14 are heated as fully described in U.S. Pat. No. 3,743,556 to provide a surface coating metallurgically bonded (See FIG. 3) on a substrate 15. Briefly the coating is achieved on the substrate by first laying a flexible hard particle layer preform (matrix powder material in fibrillated PTFE) on the substrate surface to be coated and then a braze filler alloy layer or preform (typically also braze filler material in fibrillated PTFE although it can be a sheet of braze material for certain applications) is applied on top of the hard particle preform. The weight and thickness of this braze layer or preform is matched to the relative density of the hard particle preform to yield a generally fully dense layer or coating (porosity less than about 5%) of the same general thickness as that of the original hard particle matrix layer. An adhesive can be used, if desired, to initially hold the assembly together prior to brazing. Brazing is done in a controlled atmosphere or in a vacuum at a temperature above the liquidus temperature of the braze filler but below that of the melting temperature of the matrix particle layer. At such temperature molten braze infiltrates through the matrix particle preform and fills the voids and subsequently metallurgically bonds to the substrate by diffusion effect yielding a coating layer essentially the same thickness as initial hardparticle matrix layer. For standard applications hardfaced coated articles of this type have proven to be very reliable and effective.

Figure 2:
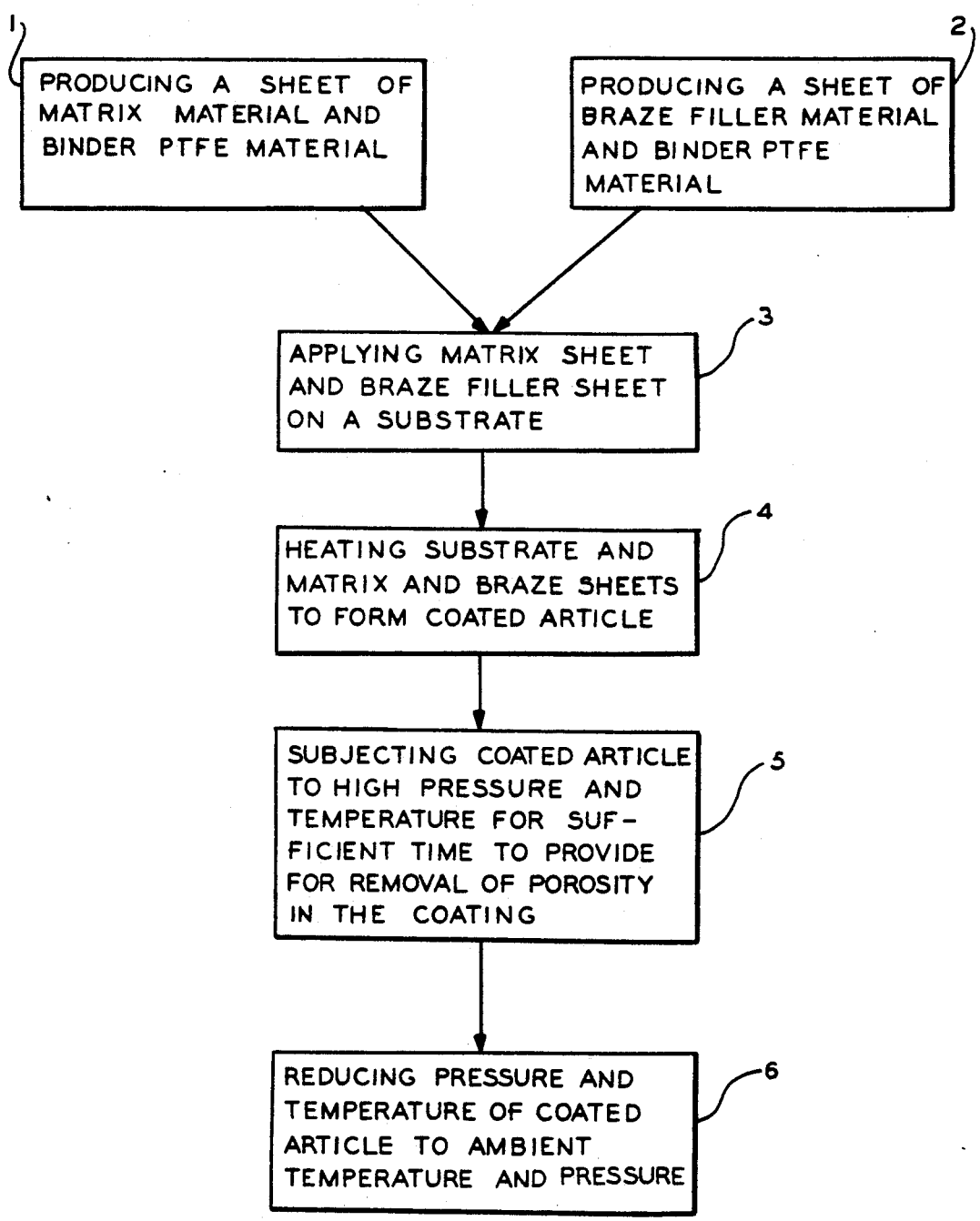
FIG. 2 is a flow diagram of the process of this invention.

FIG. 2 shows a flow diagram of the improved present invention which for the initial coating operation of an article is similar to that set forth above with reference to FIG. 1. That is, the flexible hard particle layer or sheet preform (Step 1) typically made from a material such as tungsten carbide, titanium carbide, nickel boride, chromium carbide or the like is entrapped in an organic binder of fibrillated PTFE. The braze filler material layer or sheet preform (Step 2) is also typically made with appropriate high temperature braze powders entrapped in an organic binder of fibrillated PTFE although in certain applications sheets of solid braze material may be used. The preforms of matrix material and braze material are then cut to desired configuration and then positioned on the surface of the substrate with the matrix preform typically directly on top of the substrate surface and the braze preform on top of the matrix preform (Step 3). A suitable adhesive typically is used to hold the assembly together. The assembly is then heated (Step 4) in a controlled atmosphere or in a vacuum at a temperature above the liquidus temperature of braze preform but below that of the melting temperature of the matrix preform and the PTFE binder decomposes and the braze material top layer infuses by capillary action into the matrix layer. Upon cooling to a temperature below the solidus temperature of the braze filler material, the assembly yields a coated composite article with relatively low porosity (less than about 5%) with the coating metallurgically bonded to the substrate material. This hardfaced coated article is then subjected to uniform high pressure and heat (Step 5) which causes any porosity in the coating to be removed resulting in total densification of the coating. That is, the coated article is subjected to "Hot Isostatic Pressing" (HIP) or similar process. In the HIP process, the coated article is placed in an autoclave furnace and pressure is applied to the surface of the coated article by forcing a fluid such as argon gas into the chamber. At the same time heat is applied to the coated article by the furnace. Once the desired pressure and temperature are reached the sample is maintained at this pressure and temperature for a significant length of time to allow any porosity to be eliminated. The coated article is then cooled and the pressure reduced until lowered to standard room temperature and pressure (Step 6). The coated article is now fully dense and exhibits no porosity over the entire surface of the coating.

It has been found that there is an interrelationship among the pressure and temperature used and the hold time at pressure and temperature. Typically, the pressure applied to the hardfaced coating is greater than 10,000 psi and generally greater than 20,000 psi and the temperature used is near but below the solidus temperature of the braze filler material. Also, the length of time at the elevated pressure and temperature is generally greater than 60 minutes.

In accordance with this invention, encapsulation of the initially coated article prior to the HIP process has not been needed unless there is a major surface flaw or large void seam area in the coating. In the case of a surface flaw or large seam area in the coating, encapsulation of an article being subjected to the HIP process involves the use of a metal or the like envelope sealingly enclosing the article to provide the required differential pressure effect to remove porosity. Processing the initially coated articles in this manner has proven very successful for removing above referred to large flaw and seam problems.

The present invention is described in greater detail with reference to the following examples contrasting the prior art and preferred practices of the invention.

EXAMPLE 1

Tungsten carbide powder (40% by volume 2 to 5 micron size particles and 60% by volume −325 mech size particles) was mixed with 6% by volume of PTFE. This mixture was mechanically worked to fibrillate PTFE and trap the tungsten carbide particle and then rolled, thus making a cloth-like sheet as fully described in U.S. Pat. No. 4,194,040. The sheet was rolled to 0.030" thickness.

A braze metal filler powder with the composition of 81.5% nickel, 15% chromium and 3.5% boron by volume was mixed with 6% by volume of PTFE to form a cloth-like sheet, similar to that of the tungsten carbide sheet set forth above. A test sample to be hardfaced was a plain carbon steel pipe. The tungsten carbide sheet preform was applied on the substrate surface by means of adhesive and on top of it a braze filler sheet preform was glued in place. The test sample was heated in a vacuum furnace to 2085° F. for approximately 30 minutes during which time the braze preform melted and infiltrated the carbide preform upon cooling, a tungsten carbide coating metallurgically bonded on the steel substrate was formed as described more fully in U.S. Pat. No. 3,743,556.

Figure 3:
FIG. 3 is a photomicrograph of a cross section of FIG. 1.

The test sample was cut and prepared for a metallography examination. The results indicated that the major portion of the coating was nearly fully dense, but there were some areas where porosity was observed as shown in FIG. 3.

EXAMPLE II

A second plain carbon steel pipe was coated with the same preform materials and in the same manner as described in Example I. This second tungsten carbide coated sample was then subjected to a uniform high pressure and temperature—Hot Isostatic pressing (HIP). Briefly, the coated sample was placed in a autoclave furnace and gradually pressure was applied by forcing argon gas into the chamber. Simultaneous heat was applied on the sample by the furnace. The pressure was raised to 30,000 psi and the temperature to 1900° F. and these conditions were held for three hours. After three hours of hold time, the pressure and temperature were lowered slowly to room temperature and pressure.

Figure 4:
FIG. 4 is a photomicrograph of a cross section of an article produced according to the present invention.

A sample was cut and prepared for metallography examination. The result indicated that no porosity was observed in any area of the coating as shown in FIG. 4.

It is apparent that there has been provided in accordance with this invention a process and product which fully satisfy the objects, means and advantages set forth herein before. While the invention has been described in combination with the specific embodiments thereof, it is evident that many alternatives, modifications and variations will be apparent to those skilled in the art in light of the foregoing description. One example would be the use of a multilayer construction for producing the coating as disclosed and incorporated by reference herein in co-pending applications Ser. No. 475,745 filed Feb. 6, 1990 and Ser. No. 639,812 filed Jan. 9, 1991. Still another example would be the use of a soft intermediate layer between the coating and substrate as disclosed and incorporated by reference herein in co-pending application Ser. No. 475,757 filed Feb. 6, 1990. Accordingly, it is intended to embrace all such alternatives, modifications and variations as fall within the spirit and scope of the appended claims.

We claim:

1. An improved method for producing a fully dense, uniformly coated article having a hard metallic surface layer on a substrate having a simple or complex shape, the surface layer constituting the residue of a flexible cloth-like preform, the preform being made by mixing a powdered metal of the surface layer with mechanically fibrillated PTFE and rolling the mixture to form the preform in a desired configuration, the method including placing the preform on the substrate and heat brazing the surface layer preform to the substrate with a desired braze filler material yielding a metallurgically bonded coated article; wherein the improvement comprises:

subjecting the coated article without an outer surface encapsulating means to a uniform high pressure and temperature for a time sufficient to produce a coating capable of being polished to a surface finish of 4 RMS or better.

2. The method of claim 1, wherein:
    the powdered metal of the surface layer is selected from the group consisting of tungsten carbide, titanium carbide, nickel boride and chromium carbide.

3. The method of claim 1, wherein:
    the uniform high pressure is at least 10,000 psi.

4. The method of claim 1, wherein:
    the temperature is less than the solidus temperature of the braze filler material.

5. The method of claim 4, wherein:
    the temperature is greater than 80% of the solidus temperature of the braze filler material.

6. The method of claim 1, wherein:
    the sufficient time is greater than about 60 minutes.

7. The method of claim 1, wherein:
    the braze filler material is a cloth-like flexible metallic layer containing braze filler particles in PTFE carrier material.

8. The method of claim 1, wherein:
    the metallic coating is formed from more than one cloth-like flexible metallic layers.

* * * * *